United States Patent
Wittek et al.

(10) Patent No.: US 12,548,962 B2
(45) Date of Patent: Feb. 10, 2026

(54) ACTIVE TRANSVERSE MODE INSTABILITY MITIGATION FOR HIGH POWER FIBER AMPLIFIERS APPARATUS, METHODS, AND APPLICATIONS

(71) Applicant: UNIVERSITY OF CENTRAL FLORIDA RESEARCH FOUNDATION, INC., Orlando, FL (US)

(72) Inventors: Steffen Wittek, Orlando, FL (US); Juan Carlos Alvarado Zacarias, Orlando, FL (US); Daniel Cruz Delgado, Orlando, FL (US); Jose Enrique Antonio Lopez, Orlando, FL (US); Rodrigo Amezcua Correa, Orlando, FL (US); Matthew Cooper, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 1038 days.

(21) Appl. No.: 17/455,726

(22) Filed: Nov. 19, 2021

(65) Prior Publication Data

US 2022/0158405 A1    May 19, 2022

Related U.S. Application Data

(60) Provisional application No. 63/115,727, filed on Nov. 19, 2020.

(51) Int. Cl.
H01S 3/00    (2006.01)
H01S 3/067   (2006.01)

(52) U.S. Cl.
CPC ...... *H01S 3/06733* (2013.01); *H01S 3/06716* (2013.01)

(58) Field of Classification Search
CPC .................. H01S 3/06733; H01S 3/06716
See application file for complete search history.

(56) References Cited

U.S. PATENT DOCUMENTS

2017/0299900 A1 * 10/2017 Montoya ............... G02F 1/0121
2020/0083659 A1 *  3/2020 Reeves-Hall ....... H01S 3/06787

FOREIGN PATENT DOCUMENTS

CN           109031516 A  * 12/2018 ............... G02B 6/02

* cited by examiner

*Primary Examiner* — Mark Hellner
(74) *Attorney, Agent, or Firm* — Klintworth & Rozenblat LLP

(57) ABSTRACT

Apparatus and methods for mitigating transverse mode instabilities (TMI) in high power fiber amplifiers that does not depend on active feedback loops. The apparatus and method involve the modulation of the amplitude and/or phase of selected spatial mode components of an input signal beam to increase the TMI threshold of the amplifier. Once the desired modal adjustments are made, the beam is input to a mode multiplexer whereupon an optimized output beam can be input to the active fiber of the amplifier system. By increasing the TMI threshold of the amplifier, the amplifier can be operated at higher power before TMI sets in. A control stage of the fiber amplifier system includes (a) a (seed) beam splitting section; (b) an amplitude and phase control component; and (c) a mode multiplexer that maps multiple individual signal beams to different fiber modes.

13 Claims, 6 Drawing Sheets

Fig. 1
(a)
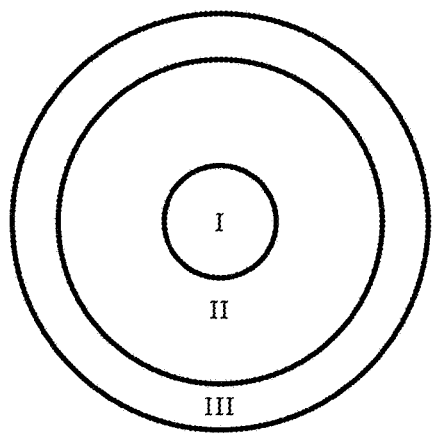
Fig. 1
(b)
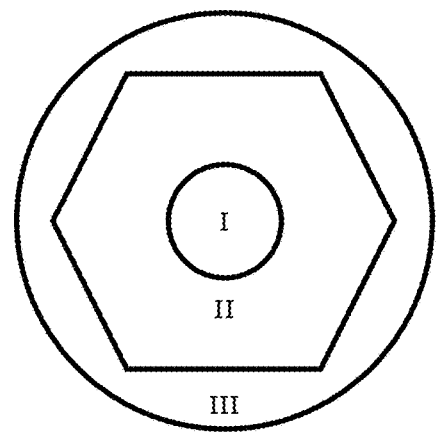
I: Doped core
(signal guidance)
II: Cladding
(pump guidance)
III: Double cladding
FIG. 1

FIG. 3

ACTIVE TRANSVERSE MODE INSTABILITY MITIGATION FOR HIGH POWER FIBER AMPLIFIERS APPARATUS, METHODS, AND APPLICATIONS

RELATED APPLICATION DATA

The instant application claims priority to U.S. Provisional application Ser. No. 63/115,727 filed Nov. 19, 2020, the subject matter of which is incorporated by reference in its entirety.

GOVERNMENT FUNDING

Funding for the invention was provided by AFOSR: FA9550-15-1-0041, ARO: W911NF1210450, and High Energy Laser Joint Technology Office (HEL-JTO): W911NF1210450. The U.S. government has certain rights in the invention.

BACKGROUND

Non-limiting aspects and embodiments most generally pertain to the field of fiber amplifiers, more particularly to apparatus and methods that enable the suppression of transverse mode instabilities (TMI) in high power fiber amplifiers, and most particularly to apparatus and methods for fiber amplifier TMI mitigation without active feedback modal control, and applications thereof.

The impressive growth experienced by fiber lasers and amplifiers has been made possible due to their remarkable power scalability, excellent thermal management, and ability to be integrated into rugged modular systems. As such, systems with kilowatt average power in continuous wave (CW) operation regime or megawatt peak power in pulse operation are now readily available and are routinely used in a wide range of material processing and medical applications including but not limited to, sintering, cutting, micromachining, surface patterning, drilling, surface cleaning and welding. Fiber laser systems delivering single-mode laser beams (diffraction limited beams) with high beam quality, that is beams with a beam-quality factor close to $M^2=1$, are of particular interest for applications where a small focus spot is desired or a long working distance that separates optical elements from workpieces and hence increase their lifetime. However, due to the high optical intensity in the fiber core, both pulsed and CW laser systems are limited by nonlinear effects such as four-wave mixing, self-phase modulation, stimulated Brillouin scattering (SBS), and stimulated Raman scattering (SRS). In order to mitigate these undesirable nonlinear effects, extensive investigations have been concentrated on the development of large mode area (LMA) fibers. LMA fibers feature an increased core diameter and in consequence larger guided modes. The use of LMA fibers is an effective strategy to mitigate optical nonlinearities (such as SBS and SBS) by reducing the optical field intensity within the Yb-doped core, along with shortening the required fiber length. However, as the mode field diameter of LMA fibers increases, it becomes more difficult to maintain single-mode operation and to inhibit excitation of higher-order modes (HOMs). The presence of HOMs in LMA fibers used in laser systems operating at average output powers above 500 W makes it difficult to further scale average power while maintaining a high beam quality.

Quantum defect between the signal and pump light associated to the lasing process produces significant heat deposition on the fiber at multi-kilowatt average power operation. The propagation of HOMs in turn produces thermally induced refractive index changes, which have been identified to underpin the onset of thermal mode instability (TMI) at high average output powers. This thermo-optic mechanism ultimately limits the stable operation of the fiber amplifier system. TMI manifests itself as a sudden transition from stable single-mode operation to a regime in which the output spatial mode profile fluctuates rapidly due to power coupling between the fundamental and higher order modes. In other words, TMI couples light from the fundamental mode ($LP_{01}$) to higher order modes at high average power operation causing a degradation of the beam quality.

TMI mitigation techniques deploying amplitude and phase control of the seed signal were first implemented by Otto et al. (Controlling mode instabilities by dynamic mode excitation with an acousto-optic deflector, Optics Express 21, 17285 (2013)). They used a feedback-controlled acoustic-optic modulator to sweep a beam across a fiber core to stabilize the output beam above TMI threshold. The output of the amplifier was monitored for beam fluctuations to control the input to the amplifier in such a way as to stabilize the output beam using a standard control loop. In another demonstration, Montoya et al. (Photonic lantern adaptive spatial mode control in LMA fiber amplifiers. Optics Express 24, 3405 (2016), and US Patent 2020/0083659 A1) reportedly used a photonic lantern to selectively excite modes at the amplifier input to retain single-mode operation above TMI threshold. Similarly, this demonstration relied on a feedback loop to stabilize the output beam. Naturally, a feedback loop increases the complexity of the amplifier design, and as such it is desirable to develop a new mitigation technique that does not require active control loops.

The known art apparatus and techniques require, for example, internal and external system modifications for TMI mitigation and power scaling including active control loops, require larger equipment footprints, and are not optimally robust due to free-space beam paths, which are drawbacks of the known art. The main challenge remains to achieve stable single-mode operation of optical fiber amplifier operating at multi-kW average output powers. Particularly important is to mitigate TMI effects. In view of the technological deficiencies and shortcomings in the current state of the art, the advantages and benefits of apparatus and methods for mitigating TMI in high power fiber amplifiers and enabling power scaling without incorporating active feedback control loops, and eliminating the known disadvantages in the prior art. Such apparatus and methods are enabled as described herein below and in the appended claims.

SUMMARY

Embodiments and aspects disclosed herein are most broadly directed to apparatus and methods enabling suppression of TMI in fiber amplifiers without incorporating feedback control apparatus or techniques. Method embodiments most generally involve suppressing TMI in a fiber amplifier by modulating the spatial modal distribution of the seed beam at the input of the fiber amplifier.

An aspect of the invention is a fiber amplifier system. In a non-limiting, exemplary embodiment the amplifier system includes an input signal beam splitter that provides at least two output signal beams; a phase/amplitude modulator adapted to receive the at least two output signal beams, wherein each input signal beam can be modulated in phase and/or amplitude, providing at least two phase/amplitude-modulated output signal beams; a spatial mode multiplexer adapted to receive the at least two phase/amplitude-modulated output signal beams and output a single multimode signal beam; and an active fiber adapted to receive the single multimode signal beam and subsequent amplification. In various non-limiting, exemplary embodiments the fiber amplifier system may have one or more of the following features, characteristics, limitations, or functions alone or in various combinations:

wherein the input signal beam splitter is one of a bulk optic beam splitter, a fiber beam splitter, a waveguide beam splitter, a photonic lantern beam splitter;

wherein the phase/amplitude modulator comprises a time-varying signal modulator element;

wherein the spatial mode multiplexer is one of a photonic lantern, a multiplane light conversion device, a spatial light modulator, a digital micromirror, a phase plate;

wherein the active fiber is a double-cladding doped optical fiber;

wherein the active fiber has a cross-sectional non-circular shaped cladding;

wherein the active fiber has a core doped with one of ytterbium, erbium, thulium, holmium.

characterized by an output average power equal to or greater than 500 W.

An aspect of the invention is a method for increasing a transverse mode instability (TMI) threshold of a fiber amplifier. In an exemplary, non-limiting embodiment the method includes the steps of providing an input signal beam to be amplified having an inherent TMI threshold; splitting the input signal beam into at least two beams; modulating the phase and/or amplitude of each of the at least two signal beams; combining the at least two modulated signal beams into a single multimode output signal beam; and inputting the single multimode output signal beam into a doped, active fiber of the fiber amplifier to produce an amplified output beam, whereby the amplified output beam has a TMI threshold that is higher than the inherent TMI threshold of the input signal beam. In various non-limiting, exemplary embodiments the method may have one or more of the following steps, features, characteristics, limitations, or functions alone or in various combinations:

comprising modulating the phase and/or amplitude of each of the at least two signal beams at the same or different frequency or combinations thereof.

comprising modulating the phase and/or amplitude of each of the at least two signal beams during operation of the fiber amplifier.

BRIEF DESCRIPTION OF THE DRAWINGS

FIG. 1 shows a cross-section of a double-clad fiber with (a) azimuthally symmetric core and (b) hexagon-shaped pump cladding. Cross-section shows fiber separated into (I) doped core, (II) inner cladding and (III) outer cladding, according to a non-limiting, exemplary aspect of the invention.

DETAILED DESCRIPTION OF NON-LIMITING, EXEMPLARY EMBODIMENTS

Figure 2:
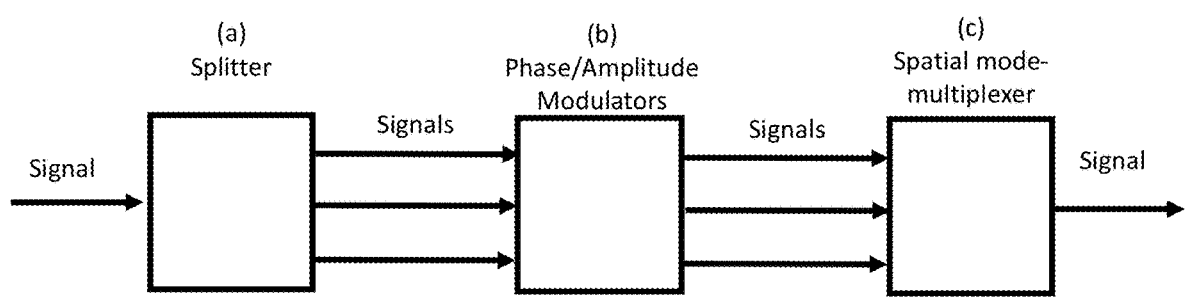
FIG. 2. schematically shows the elements (a, b, c) making up the control stage, according to a non-limiting, exemplary embodiment.

Disclosed embodiments are described with reference to the attached figures, wherein like reference numerals are used throughout the figures to designate similar or equivalent.

DETAILED DESCRIPTION OF NON-LIMITING, EXEMPLARY EMBODIMENTS

Disclosed embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships and methods are set forth to provide a more complete understanding of the embodiments disclosed herein.

Non-limiting, exemplary embodiments describe time-dependent excitation of selected fiber modes to suppress transverse mode stabilities (TMI) advantageously without relying on active feedback for the control loop. In particular, we mitigate transverse mode instabilities appearing in high-power fiber amplifiers by controlling/adjusting the amplitude and/or phase of a selected set of spatial modal components of the input signal using predefined modulation schemes determined empirically and/or analytically. The modulation used for controlling the spatial mode components of the input signal can be adjusted in operation of the amplifier to compensate for any drift/degradation of the beam quality and output power.

Apparatus and methods are disclosed for mitigating transverse mode instabilities (TMI) in high power fiber amplifiers. Knowledge of the modes guided in these fiber amplifiers allows the simulation of their behavior and TMI characteristics during high power operation of the amplifier. The modulation of the phase/amplitude of the input beam is determined by the fiber amplifier parameters (e.g., active fiber index and active-doping profiles, active fiber core diameter, active fiber cladding diameter, fiber amplifier length, pumping and seed configurations, and others well known in the art), and is not based on one or more active feedback loops. The required input beam modulation scheme for TMI mitigation can be determined empirically and/or analytically, for example, by analysis of the amplifier in operation and/or by numerical simulation of the amplifier system. In some cases, adjustment of the modulation parameters can be made during operation to maintain a high beam quality. The particular schemes can be of simple nature and, in general, require the modulation of both the amplitude and phase of selected spatial mode components of the input signal.

The high-power fiber amplifier system includes at least one double-cladding, doped optical fiber. The double-cladding structure allows for efficient coupling of pump light into the cladding for pumping the active core region. A cross-section of such fiber is depicted in FIG. 1 with a (a) circular and (b) hexagonally-shaped cladding. The pump light is guided within the cladding (II), which overlaps with the core region (I). The signal light is guided in the fiber core (I). The core material may appropriately be doped with a gain material (e.g., ytterbium-doped glass for signal wavelengths in the typical range of 1020 nm to 1085 nm). Other active dopants for other emission wavelengths may include but are not limited to erbium, thulium, holmium, and others known in the art. At high power operation the fiber core guides at least two modes, the fundamental spatial mode and at least one higher order mode (HOM). The fiber amplifier system further includes (a) a signal beam splitting section; (b) an amplitude and phase control component; and (c) a spatial mode multiplexer that maps the individual input beams to different spatial modes (mode selective device) in the output fiber that is ultimately connected to the doped amplifier fiber (FIG. 2). In some cases, the spatial mode multiplexer is a non-mode selective device that maps the individual input beams to a linear combination of spatial modes of the output beam, which is then optically connected to the amplifier fiber. In its most general aspect, the apparatus allows to modulate the amplitude and/or phase of a selected set of spatial modal components. Moreover, the apparatus also allows to modulate each individual spatial mode component at a specific frequency to stabilize the high-power beam at the fiber amplifier output.

In an exemplary, non-limiting embodiment, first an initial signal beam is split into multiple lower power beams (at least two) via beam splitters. Examples of beam splitters include but are not limited to bulk optic beam splitters, fiber beam splitter, waveguide beam splitter, photonic lantern beam splitter, or other appropriate beam splitters known in the art. In operation, after the initial signal beam is divided into multiple beams, the phase and/or amplitude of each beam is modulated via time-varying signals. After amplitude/phase adjustments required for stabilizing the high power output beam are made on each individual channel, the multiple beams are input to a spatial mode-multiplexer that re-combines them into one multimode signal beam. At this point, the multimode signal beam carries the modulated power/phase distribution. Subsequently, the modulated signal beam at the output of the mode-multiplexer can be coupled to the high-power fiber amplifier to amplify the signal. The modulation of the input signal beam enables an increase in the observed beam quality at the amplifier output at high average powers.

Examples of spatial mode-multiplexers include but are not limited to photonic lanterns, multiplane light conversion devices (MPLCs), spatial light modulators, digital micromirror devices, phase plates, and other known spatial deMUX apparatus. The exemplary splitter, modulator, and spatial mode multiplexer arrangement enables control/adjustment of the amplitude and/or phase of selected spatial mode components of the input signal.

By increasing the TMI threshold of the amplifier, the amplifier can be operated at higher average power before TMI sets in and the amplifier output beam becomes unstable.

The control stage of the associated fiber amplifier system includes (a) an input (seed) beam splitting section; (b) an amplitude and phase control component; and (c) a spatial mode multiplexer that maps the individual input beams to different spatial modes (mode selective device) in the output fiber that is ultimately connected to the doped amplifier fiber (FIG. 2). In some cases, the spatial mode multiplexer is a non-mode selective device that maps the individual input beams to a linear combination of spatial modes of the output beam, which is then optically connected to the amplifier fiber.

In an exemplary experimental implementation, beam splitting can be implemented with interleaved beam splitters (e.g., bulk optic beam splitters, fiber beam splitters, waveguide beam splitters, photonic lantern beam splitters, and other know beam splitting devices) to generate a number of beams from a single-mode laser seed. For (b), temporal control of amplitudes and phases can be achieved through, e.g., electro-optic modulators, acousto-optic modulators, and other known devices, in frequency ranges from Hz to GHz. Finally, the combination of the multiple beams into a single multimode beam is carried out in the mode-multiplexer; part (c), can be implemented using photonic lanterns, multi-planar light conversion schemes, and other devices known in the art. Subsequently, the output from the mode-multiplexer can be optically coupled into the high power amplifier fiber for amplification. The modulation of the input signal beam enables an increase in the beam quality at the amplifier output at high average powers. Preferably, the TMI average power threshold increase is at least 1.2 times compare to an amplifier system operating without applying any modulation.

The approach can be implemented for at least two spatial modes (fundamental mode and one higher order mode). However, many more spatial modes can be used to effectively mitigate TMI for a wide range of fibers and amplifier parameters (e.g., active fiber index and active-doping profiles, active fiber core diameter, active fiber cladding diameter, fiber amplifier length, pumping and seed configurations, etc.) for both CW and pulsed systems. In such case, the active core region can support more than two spatial modes at high average power operation. For instance, the mode-multiplexer can support >1000 modes, advantageously between 2 to 100. The number of modes is chosen to be similar to the number of modes supported by the amplifier fiber at high power operation.

Figure 3:
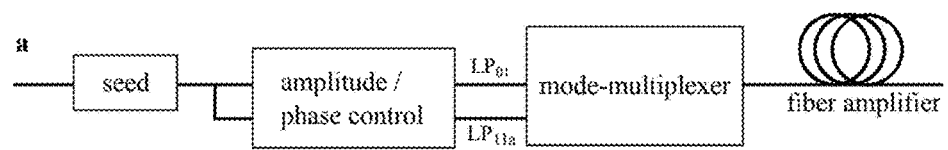
FIG. 3 schematically illustrates an experimental implementation of the control stage apparatus for (a) two modes, (b) a multitude of modes, and (c) directly inside the cavity of a few-mode oscillator, according to a non-limiting, exemplary aspect of the invention.
Figure 3:
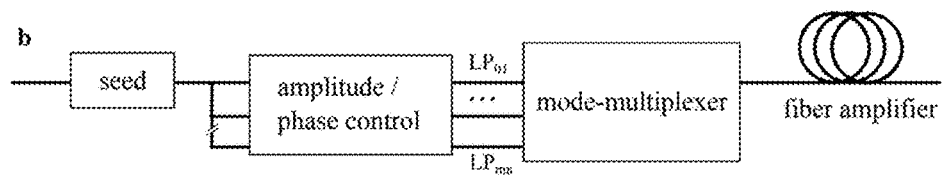
Figure 3:
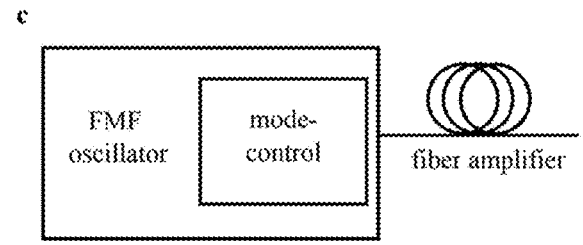

The output beam of the mode-multiplexer is guided into the fiber amplifier either via free-space or via a fiber optic, which can then be fusion spliced to the active fiber. FIGS. 3a, 3b, and 3c show different implementations of this scheme as follows: FIG. 3a shows an implementation where the seed is split into two spatial modes, $LP_{01}$ and $LP_{11a}$, which are both controlled in amplitude and phase and ultimately recombined; FIG. 3b extends this concept to a multitude of modes, $LP_{01}$ to $LP_{mn}$ (m≥0, n>0), advantageously (m<15 and n<15).

FIG. 3c shows a few-mode fiber (FMF) oscillator where the phase/amplitude modulation for each spatial mode is carried out inside the oscillator cavity prior to the high-power amplifier. The combination of seed laser and control stage, where the mode modulation happens inside the FMF oscillator itself by using a mode-multiplexer (i.e., photonic lanterns, multiplane light conversion devices, phase plates, spatial light modulators, digital micromirror devices, phase plates, and other known spatial mode multiplexer apparatus) within the oscillator. In such an implementation the different spatial modes supported by the mode-multiplexer are individually modulated in both phase and amplitude. In this case, the multimode output from the oscillator can be directly coupled to the high-power amplifier fiber.

High power amplifier fibers present a pump cladding NA>0.1, advantageously between 0.1 to 0.6. The cladding may typically be un-doped silica. Other doping and glass materials are also possible. Appropriate glass materials will be known in the art. Ultimately, total internal reflection must be maintained to confine the signal light to the core region and the pump light to the pump cladding. The core and pump cladding may further be surrounded by one or more additional material layers and/or coating layers. The pump cladding diameter will advantageously be 30 µm-1500 µm, and more advantageously between 100 µm-650 µm. The active-doped core will advantageously have an NA larger than 0.001, and more advantageously 0.01 to 0.1. The active fiber can be doped with Yb, Er, Tm, Ho, and/or Tm for amplifying the signal beam. The length of the high power amplifier fiber is advantageously between 0.25 m to 100 m, more advantageously from 0.5 m to 40 m. In addition, the input signal beam and/or pump beams can be coupled to the high power amplifier via free space and/or fiber pump/signal combiners. Many arrangements of pump/signal beam combiners are possible to couple the signal light into the active core and the pump light into the pump cladding. For instance, the input signal beam and pump beam co-propagate (propagate in the same direction) in the amplifier fiber. Likewise, counter-propagating pumping schemes are possible where the pump and signal light propagate in opposite directions. In addition, hybrid (simultaneous co-propagating and counter-propagating) pumping can be implemented. Likewise, the input signal and/or pump beams can be optically coupled to the end facet(s) of the active fiber using free space optics and/or be directly spliced to the doped fiber using a pump signal combiner. Alternatively, the pump beam or beams can be side-coupled to the active fiber at different points along the length of the active fiber.

Demonstrative Example

An amplifier consists of a 50/500 µm core/cladding diameter Yb-doped fiber having a core numerical aperture (NA) of 0.02, a pump cladding NA of 0.44, and fiber length of 1.8 m. The total seed power is 10 W at 1064 nm wavelength and the amplifier is co-pumped at 976 nm and a uniform distribution of the pump light across the pump cladding and core is assumed. Using a simulation that captures the dynamic behavior of a fiber amplifier the transverse mode instability threshold was determined to be around 330 W without any modulations of the seed signal. Such simulations are described in detail by Jauregui et al. "Simplified modelling the mode instability threshold of high-power fiber amplifiers in the presence of photodarkening," Optics Express 23, 20203 (2015) and "Pump modulation induced beam stabilization in high-power fiber laser systems above the mode instability threshold," Optics Express 26, 10691 (2018).

Figure 4:
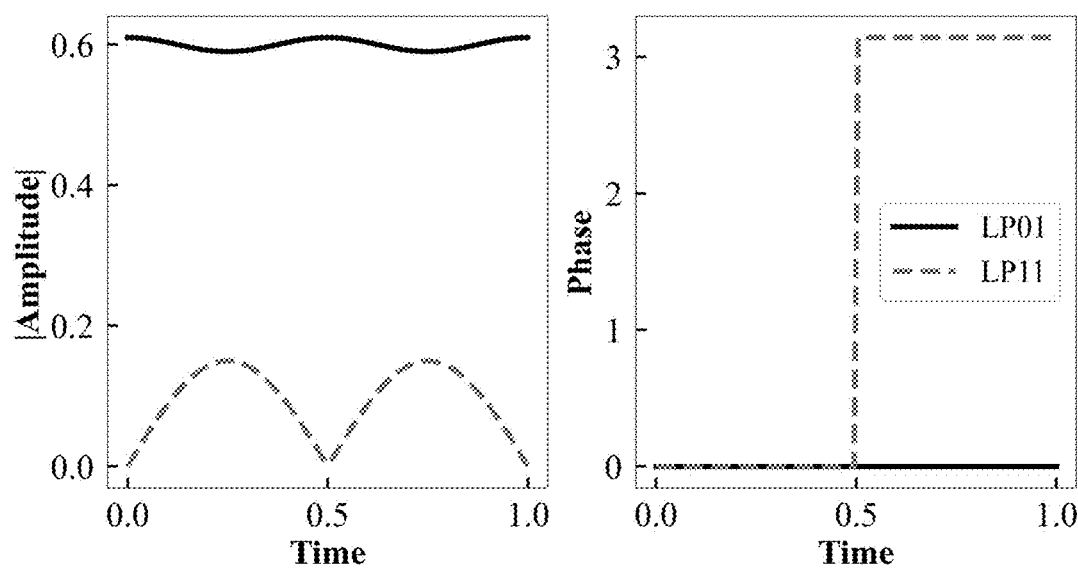
FIG. 4 graphically shows an example of amplitude and phase modulation for TMI mitigation using two modes, according to a non-limiting, exemplary aspect of the invention.

To increase the TMI power threshold the phase and amplitudes of the first two fiber spatial modes $LP_{01}$ is modulated at a given frequency (f) and $LP_{11a}$ is modulated at double that frequency (2f), FIG. 4. In this particular example, the ratio between the modulation frequency of the fundamental mode and that of the higher order mode is 2:1 (i.e., 2f, f) as shown in FIG. 4. Additionally, the fundamental mode ($LP_{01}$) carries most of the seed power and it presents only small modulation depth. In contrast, the higher-order mode $LP_{11a}$ exhibits a more pronounced modulation depth while carrying only a fraction of the total input (seed) signal power (i.e., total input signal power equals power in the fundamental mode plus power in the higher order mode). For the purpose of this example, other frequency ratios can be chosen, and the modulation frequencies may range from a few Hz to several GHz. The disclosed method is not limited to the frequencies and modulation exemplified. Another implementation may distribute power differently between the modes. The exemplary modulation represents a beam oscillating uni-axially across the core. When scanning the modulation frequency from 400 Hz to 4000 Hz a stable region can be found where higher order modes can be successfully suppressed in the output of the fiber amplifier leading to an increased amplifier operation at 1.4-times above the nominal TMI power threshold (i.e., TMI power threshold without any modulation of the signal beam). This threshold increase allows stable operation of the amplifier above the TMI power threshold.

Figure 5:
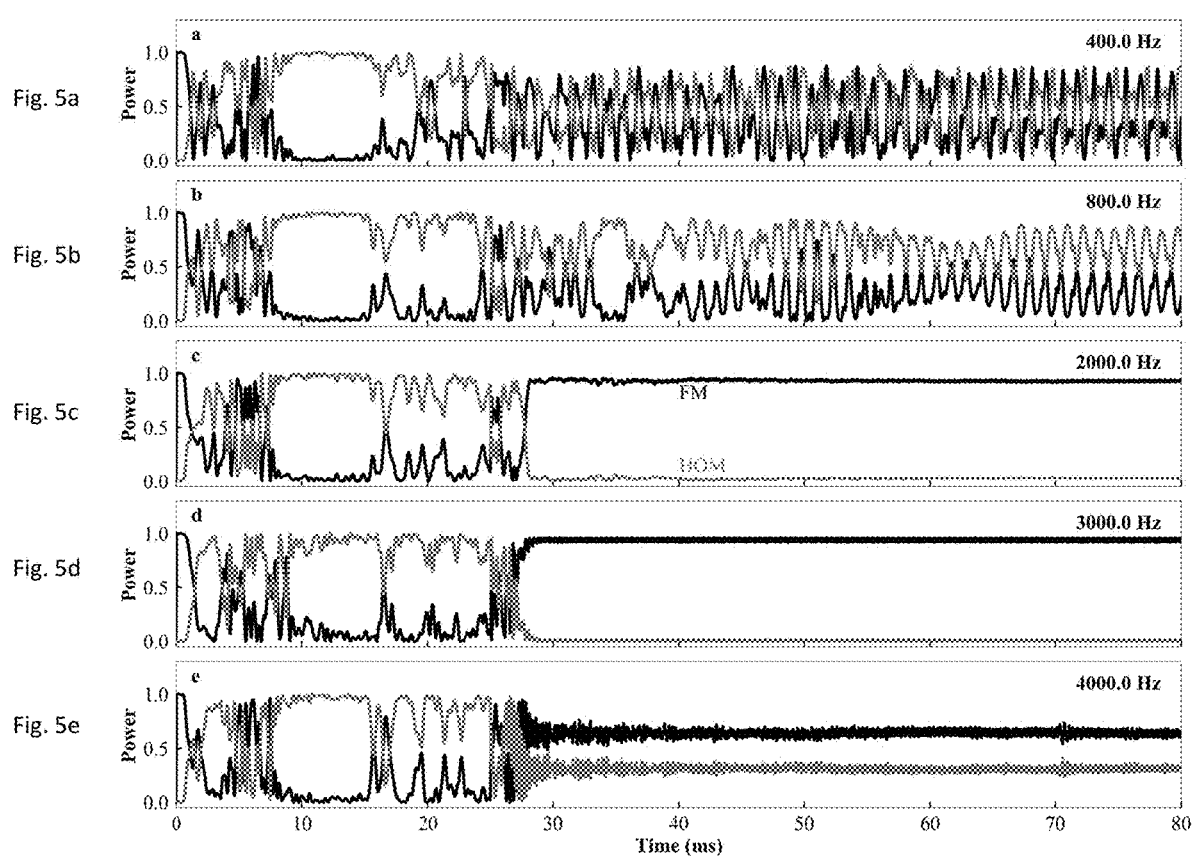
FIG. 5 graphically illustrates spatial-temporal control to stabilize the output above TMI threshold, according to a non-limiting, exemplary aspect of the invention. Here shown are five different modulation frequencies 400 Hz (FIG. 5a); 800 Hz (FIG. 5b); 2000 Hz (FIG. 5c); 3000 Hz (FIG. 5d); 4000 Hz (FIG. 5e). Note that only around the modulation frequency of 2000 Hz is the refractive index grating washed out and the output beam stable.
Figure 6:
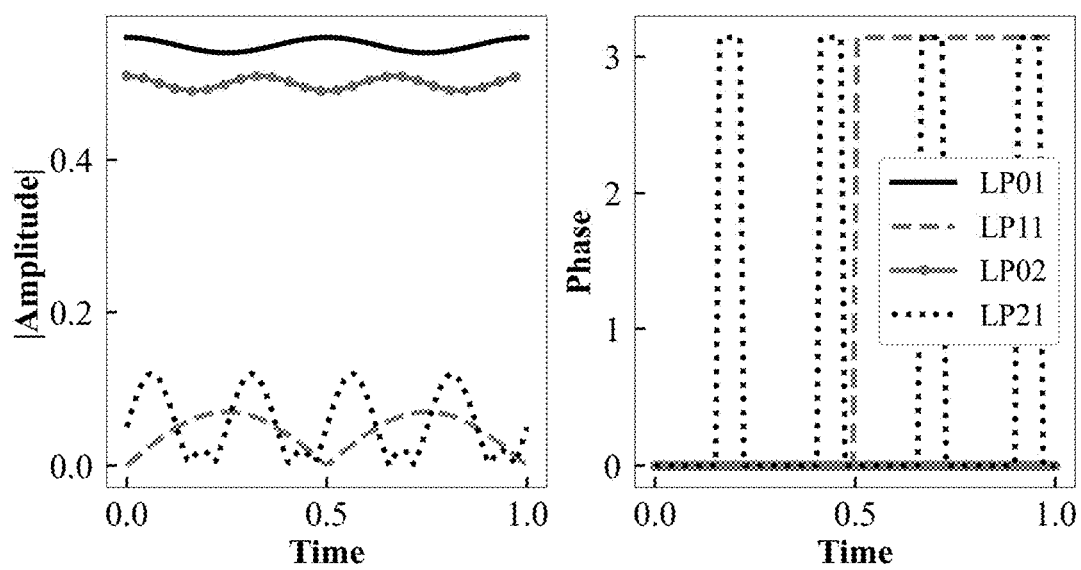
FIG. 6 graphically shows an example of amplitude and phase modulation for TMI mitigation using four modes, according to a non-limiting, exemplary aspect of the invention.

In the tests an unstable output beam was obtained for modulation frequencies in the range of 400 Hz and 800 Hz (FIGS. 5 a,b). By increasing the modulation frequency from approximately 1500 Hz to 3500 Hz the output beam stabilizes (FIGS. 5 c,d). For higher modulation frequencies the output beam returns to an unstable regime (FIG. 5e). This result clearly indicates that there is a range of frequencies at which TMI can successfully be suppressed. For this exemplary amplifier configuration, we found that the optimum frequency range was between approximately 1500 Hz to 3500 Hz. When the modulation frequency is too slow, the refractive index grating formed by the interference between modes has enough time to develop, and efficient coupling of energy between the fundamental mode (FM) and higher-order modes (HOM) occurs (FIGS. 5a,b), as discussed by Jauregui et al. "Transverse mode instability," Advances in Optics and Photonics 12, 429 (2020). On the other hand, for a too large frequency of the modulation, the refractive index grating assumes the average of the interference pattern, which is likely to be inhomogeneous and again decreases the output beam quality (FIG. 5e).

The inventors note that the method itself is not limited to the frequencies and modulation parameters exemplified here. Other modulation schemes can be explored using reported simulations tools or experimental testing of fiber amplifier system. Empirically, the modulation frequency of at least one of the modes is related to the inverse of the thermal diffusion time across the fiber core, namely $$t_{core} = \frac{r_{core}^2 \times C \times \rho}{\kappa};$$

where $r_{core}$ is the active fiber core radius; C, the specific heat of the core material; $\rho$ is the mass density; and k is the thermal conductivity of the core. This example considers co-propagating pumping, however, the method is also applicable to other pumping configurations such as bi-directional, counter-propagating pumping, and tandem schemes. Furthermore, the disclosed method is not limited to a particular fiber and amplifier parameters (e.g., active fiber index and active-doping profiles, active fiber core diameter, active fiber cladding diameter, fiber amplifier length, pumping and seed configurations, etc.), and can be implemented in other active fiber types and amplifier architectures.

While various disclosed embodiments have been described above, it should be understood that they have been presented by way of example only and not as a limitation. Numerous changes to the disclosed embodiments can be made in accordance with the specification herein without departing from the spirit or scope of this specification. Thus the breadth and scope of this specification should not be limited by any of the above-described embodiments; rather, the scope of this specification should be defined in accordance with the appended claims and their equivalents.

We claim:

1. A fiber amplifier system, comprising:
    an input signal beam splitter that provides at least two output signal beams;
    a phase/amplitude modulator adapted to receive the at least two output signal beams, wherein each input signal beam can be modulated in phase and/or amplitude, providing at least two phase/amplitude-modulated output signal beams;
    a spatial mode multiplexer adapted to receive the at least two phase/amplitude-modulated output signal beams and output a single multimode signal beam; and
    an active fiber adapted to receive the single multimode signal beam and provide subsequent amplification,
    wherein there is no feedback connection of the amplified output beam to the phase/amplitude modulator adapted to receive the at least two output signal beams.

2. The fiber amplifier of claim 1, wherein the input signal beam splitter is one of a bulk optic beam splitter, a fiber beam splitter, a waveguide beam splitter, a photonic lantern beam splitter.

3. The fiber amplifier of claim 1, wherein the phase/amplitude modulator comprises a time-varying signal modulator element.

4. The fiber amplifier of claim 1, wherein the spatial mode multiplexer is one of a photonic lantern, a multiplane light conversion device, a spatial light modulator, a digital micromirror, a phase plate.

5. The fiber amplifier of claim 1, wherein the active fiber is a double-cladding doped optical fiber.

6. The fiber amplifier of claim 1, wherein the active fiber has a cross-sectional non-circular shaped cladding.

7. The fiber amplifier of claim 1, wherein the active fiber has a core doped with one of ytterbium, erbium, thulium, holmium.

8. The fiber amplifier of claim 1, characterized by an output average power equal to or greater than 500 W.

9. A method for increasing a transverse mode instability (TMI) threshold of a fiber amplifier, comprising:
    providing an input signal beam to be amplified having an inherent TMI threshold;
    splitting the input signal beam into at least two beams;
    modulating the phase and/or amplitude of each of the at least two signal beams within a modulation bandwidth having a lower limit in which a refractive index grating formed by interference between modes does not have enough time to develop thus preventing efficient coupling of energy between the fundamental mode and higher order modes, and a higher limit above which the refractive index grating assumes the average of an inhomogeneous interference pattern thus decreasing output beam quality;
    combining the at least two modulated signal beams into a single multimode output signal beam; and
    inputting the single multimode output signal beam into a doped, active fiber of the fiber amplifier to produce an amplified output beam; and
    providing no feedback of the output beam to a phase and/or amplitude modulating component,
    whereby the amplified output beam has a TMI threshold that is higher than the inherent TMI threshold of the input signal beam.

10. The method of claim 9, comprising modulating the phase and/or amplitude of each of the at least two signal beams at the same or different frequency or combinations thereof.

11. The method of claim 9, comprising modulating the phase and/or amplitude of each of the at least two signal beams during operation of the fiber amplifier.

12. The method of claim 9, comprising modulating the phase and/or amplitude of each of the at least two signal beams in a bandwidth between 1500 Hz to 3500 Hz.

13. The method of claim 9, wherein the modulation frequency of at least one of the modes is related to the inverse of the thermal diffusion time across the fiber core, namely $t_{core} = (r_{core}^2 \times C \times \rho)/\kappa$; where $r_{core}$ is the active fiber core radius; C, the specific heat of the core material; $\rho$ is the mass density; and $\kappa$ is the thermal conductivity of the core.

* * * * *